US009122326B2

(12) United States Patent
She et al.

(10) Patent No.: US 9,122,326 B2
(45) Date of Patent: Sep. 1, 2015

(54) STACK-UP STRUCTURE OF AN OPTICAL PANEL AND MANUFACTURING METHOD THEREOF

(75) Inventors: Zhijun She, Zhangpu (CN); Yau-Chen Jiang, Zhubei (TW); Pingping Huang, Sanming (CN); Zhixiong Cai, Longhai (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 227 days.

(21) Appl. No.: 13/604,626

(22) Filed: Sep. 6, 2012

(65) Prior Publication Data

US 2013/0122312 A1    May 16, 2013

(30) Foreign Application Priority Data

Nov. 16, 2011   (CN) .......................... 2011 1 0379308

(51) Int. Cl.
| | |
|---|---|
| *B32B 17/06* | (2006.01) |
| *B32B 15/04* | (2006.01) |
| *B05D 3/06* | (2006.01) |
| *G06F 3/041* | (2006.01) |
| *B32B 37/00* | (2006.01) |
| *B32B 37/12* | (2006.01) |

(52) U.S. Cl.
CPC .............. *G06F 3/041* (2013.01); *B32B 37/003* (2013.01); *B32B 37/12* (2013.01); *B32B 2307/40* (2013.01); *Y10T 156/10* (2015.01)

(58) Field of Classification Search
USPC ......... 428/426, 428, 432, 688, 689, 697, 699, 428/701, 702; 427/331, 372.2, 402, 421.1, 427/446; 204/192.1
See application file for complete search history.

(56) References Cited

U.S. PATENT DOCUMENTS

| | | | | |
|---|---|---|---|---|
| 5,128,388 | A * | 7/1992 | Komori et al. .................. 522/95 |
| 6,507,337 | B1 * | 1/2003 | Sato et al. ...................... 345/173 |
| 6,903,729 | B2 * | 6/2005 | Nakanishi et al. ............. 345/173 |
| 2002/0158853 | A1 * | 10/2002 | Sugawara et al. ............. 345/176 |
| 2004/0191509 | A1 * | 9/2004 | Kishioka et al. ............... 428/354 |
| 2005/0030294 | A1 * | 2/2005 | Ahn et al. ...................... 345/173 |
| 2005/0179369 | A1 * | 8/2005 | Ohshita et al. ................. 313/504 |
| 2006/0013967 | A1 * | 1/2006 | Mikoshiba et al. ............. 428/1.1 |
| 2009/0085890 | A1 * | 4/2009 | Saito et al. ..................... 345/174 |
| 2009/0162645 | A1 * | 6/2009 | Matsuhira ...................... 428/332 |
| 2009/0183819 | A1 * | 7/2009 | Matsuhira ........................ 156/99 |
| 2009/0244024 | A1 * | 10/2009 | Kurahashi ...................... 345/173 |
| 2009/0283211 | A1 * | 11/2009 | Matsuhira .................. 156/275.7 |
| 2009/0322705 | A1 * | 12/2009 | Halsey, IV .................... 345/174 |
| 2010/0101649 | A1 * | 4/2010 | Huignard et al. .............. 136/261 |

(Continued)

FOREIGN PATENT DOCUMENTS

| | | |
|---|---|---|
| CN | 101840872 A | 9/2010 |
| CN | 101893954 A | 11/2010 |

*Primary Examiner* — David Sample
*Assistant Examiner* — Lauren Colgan
(74) *Attorney, Agent, or Firm* — Gokalp Bayramoglu

(57) ABSTRACT

The present disclosure relates to an optical panel, and more particularly, to a stack-up structure of an optical panel and the manufacturing method thereof, wherein the stack-up structure comprises: a first laminating element, which has a first laminating face; and a first protective layer, which is formed on the first laminating face of the first laminating element for flattening the first laminating face. The present disclosure allows a protective layer to be coated on a surface of a laminate to overcome unevenness problem on the surface of the laminating element, thereby avoiding generation of bubbles and enhancing the yield of products.

14 Claims, 4 Drawing Sheets

(56) References Cited

U.S. PATENT DOCUMENTS

| | | | |
|---|---|---|---|
| 2010/0139955 A1* | 6/2010 | Long et al. | 174/257 |
| 2010/0225606 A1* | 9/2010 | Sasaki et al. | 345/173 |
| 2010/0225613 A1* | 9/2010 | Iwasaki | 345/174 |
| 2010/0260986 A1* | 10/2010 | Ito | 428/212 |
| 2011/0005662 A1* | 1/2011 | Sung | 156/153 |
| 2012/0064325 A1* | 3/2012 | Fumoto et al. | 428/220 |
| 2012/0094071 A1* | 4/2012 | Itoh et al. | 428/141 |
| 2012/0113361 A1* | 5/2012 | Huang et al. | 349/96 |
| 2012/0231248 A1* | 9/2012 | Sato et al. | 428/213 |
| 2012/0249465 A1* | 10/2012 | Lin et al. | 345/173 |
| 2012/0325402 A1* | 12/2012 | Suwa et al. | 156/275.5 |
| 2013/0168138 A1* | 7/2013 | Yamazaki et al. | 174/253 |
| 2013/0202884 A1* | 8/2013 | Park et al. | 428/354 |

\* cited by examiner

STACK-UP STRUCTURE OF AN OPTICAL PANEL AND MANUFACTURING METHOD THEREOF

This application claims the benefit of Chinese application No. 201110379308.8, filed on Nov. 16, 2011.

BACKGROUND

1. Technical Field

The present disclosure relates to an optical panel. More particularly, the present disclosure relates to a stack-up structure of an optical panel and a manufacturing method thereof.

2. Description of the Related Art

In recent years, electronic products such as mobile phones, navigating systems for vehicles, portable devices, and computers having a function of touch input have significantly increased, wherein these products are usually equipped with touch panels. The touch panel usually has a cover glass, which is used for protecting touch elements in one aspect and, on the other hand, acts as an interlace on which users input information. However, due to unevenness of surface of the cover glass, some cracks occur on the surface when the cover glass is coaled with glue that is used for laminating other components of the touch panel. These cracks are not filled with the glue entirely and as a result, a small amount of air is reserved in such the cracks and then extruded while the glue is solidified. Therefore, bubbles are generated on the surface of the cover glass to cause defects in the products. These defects also exist during the lamination process between touch panel and display panel or between touch panel and plastic shell.

Thus, in order to enhance the yield of products, there exists a need of improved product structures and therefore a new type of processing technique is proposed to solve the deficiencies of the foregoing well-known techniques.

SUMMARY OF THE INVENTION

The present disclosure provides a stack-up structure of an optical panel and manufacturing method thereof, wherein a protective layer is coated on surface of a laminating element to overcome the problem of unevenness of the surface of the laminating element, thereby avoiding generation of bubbles and enhancing the yield of products.

One object of the present disclosure is to provide a stack-up structure of an optical panel, comprising:

a first laminating element having a first laminating face; and a first protective layer formed on the first laminating face of the first laminating element for flattening the first laminating face of the first laminating element.

Another object of the present disclosure is to provide a manufacturing method of a stack-up structure of an optical panel, comprising:

forming a first protective layer on a first laminating face of a first laminating element for flattening the first laminating face of the first laminating element.

According to the stack-up structure of the optical panel provided previously, laminating face of a laminating element can be coated with a protective layer, leading to planarization of the laminating face of the laminating element so as to overcome the problem of unevenness on the laminating face of the laminating element and as a result avoid generation of bubbles while being laminated, thereby enhancing the yield of products.

BRIEF DESCRIPTION OF THE DRAWINGS

For those skilled in the art, numerous embodiments and drawings are described below for illustration purpose only and not to limit the scope of the present disclosure in any manner.

DETAILED DESCRIPTION OF THE EMBODIMENTS

In order to make those skilled in the art have better understanding of the present disclosure, the following context particularly takes the favorable embodiment of the present disclosure, coupled with attached schema for detailed illustration for the constituent content of the present disclosure and the efficiency to be attained.

Figure 1:
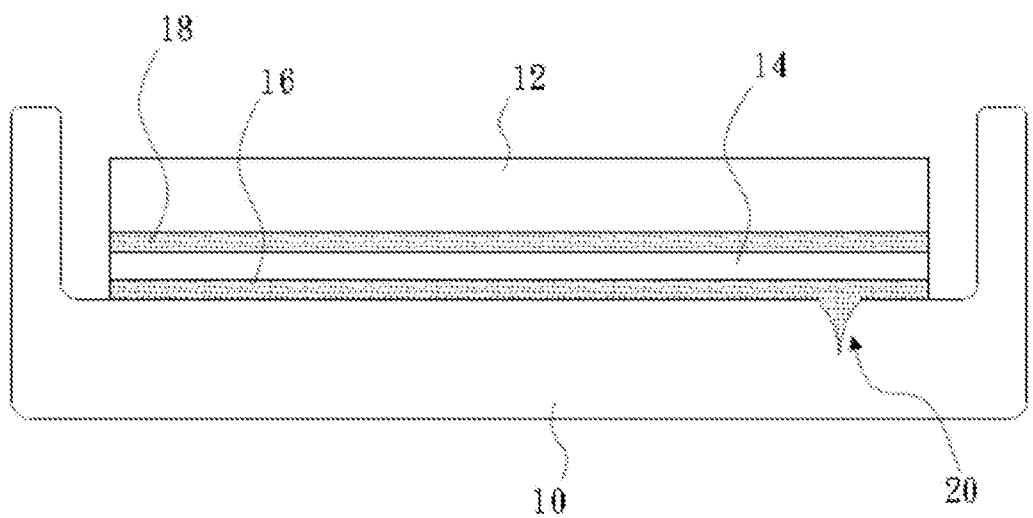
FIG. 1 is a cross-sectional drawing of a stack-up structure of an optical panel in the present disclosure.

A stack-up structure of an optical panel shown in FIG. 1 comprises: a first laminating element 10, a second laminating element 12 and an adhesive layer 14. A first protective layer 16 is formed on a laminating face, which is opposite to the adhesive layer 14 of the first laminating element 10, and a second protective layer 18 is formed on the laminating face which is opposite to the adhesive layer 14 of the second laminating element 12. The first protective layer 16 is used for flattening the laminating face of the first laminating element 10 and the second protective layer 18 is used for flattening the laminating face of the second laminating element 12, i.e., the first protective layer 16 and the second protective layer 18 are used to fill the cracks on the laminating face of the first laminating element 10 and the laminating face of the second laminating element 12.

The first laminating element 10 can be a cover glass, a plastic shell or a display panel, and the second laminating element 12 can be a touch inductive substrate, wherein the cover glass 10 can be laminated with the touch inductive substrate 12 for formation of a touch panel.

The adhesive layer 14 is an optical adhesive layer. The first protective layer 16 and the second protective layer IS are gap fillers, which fill cracks on surface of the first laminating element 10 or the second, laminating element 12. The first protective layer 16 and the second protective layer IS can be ink layers or SiO2 layers. The first protective layer 16 and the second protective layer 18 are formed on laminating face of the first laminating element 10 and laminating face of the second laminating element 12 respectively by means of printing, spraying or sputtering.

In the embodiment, since crack 20 exists on the laminating face of the first laminating element 10, the first protective layer 16 formed on the laminating face of the first laminating element 10 is used for planarization of its laminating face, i.e., the first protective layer 16 fills the crack 20 to flatten the laminating face of the first laminating element 10. Therefore, the crack 20 will not contain any air due to the filling of the first protective layer 16, and thus the adhesive layer 14 will not generate bubbles, which are formed by air healing expansion while solidifying the adhesive layer 14 through mechanisms including ultraviolet heating solidification, thereby enhancing the yield of products.

Figure 2:
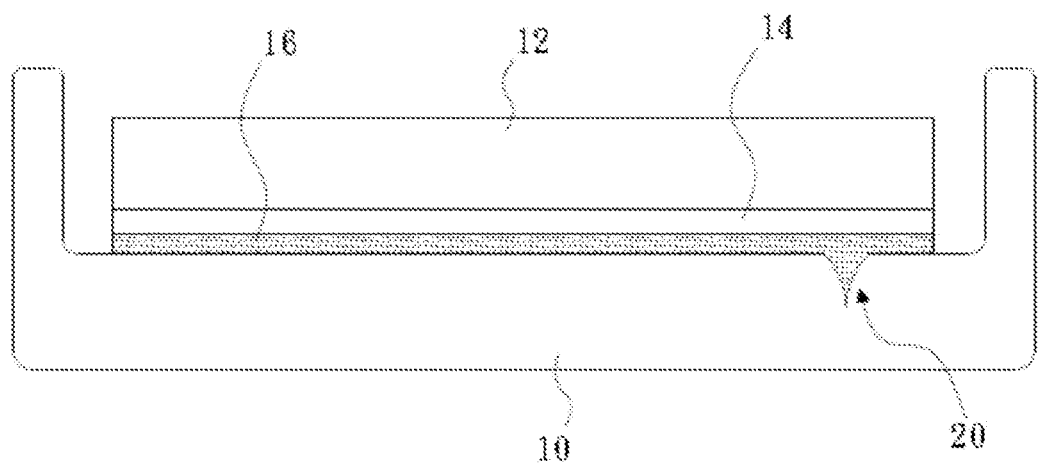
FIG. 2 is a cross-sectional drawing of formation of a protective layer only on a laminating face of a first laminating element in the present disclosure.

Prior to lamination of the first laminating element 10 and the second laminating element 12 by the adhesive layer 14, a protective layer can be formed on either surface of the first laminating element 10 and the second laminating element 12 according to uneven conditions of the laminating faces. For instance, the protective layer is only formed on the first laminating element as shown in FIG. 2. Moreover, the components of FIG. 2 similar to those of FIG. 1 are marked with same element symbols. As shown in FIG. 2, the crack 20 exists in the laminating face of the first laminating element 10, the first protective layer 16 will be formed on the laminating face of the first laminating element 10 for the planarization of this laminating face.

Figure 3:
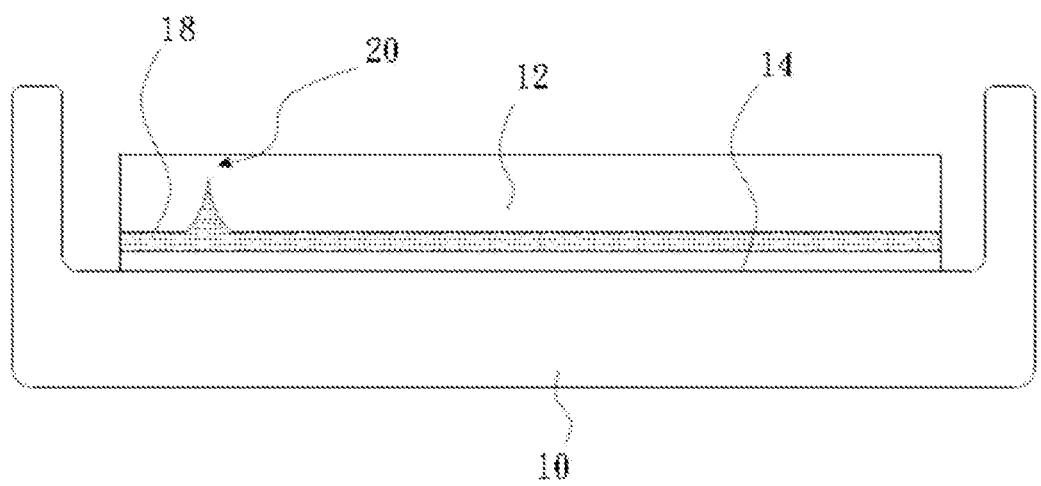
FIG. 3 is a cross-sectional drawing of formation of a protective layer only on a laminating face of a second laminating element in the present disclosure.

Further, the protective layer 18 is only formed on the second laminating element 12 as shown in FIG. 3, and the components of FIG. 3 similar to those of FIG. 1 are marked with the same element symbols. As shown in FIG. 3, the crack 20 exists in the laminating face of the second laminating element 12, wherein the second protective layer 18 is formed on the laminating face of the second laminating element 12 for planarization of this laminating face.

The following contest will illustrate manufacturing process of the lamination structures of optical panels.

Figure 4A:
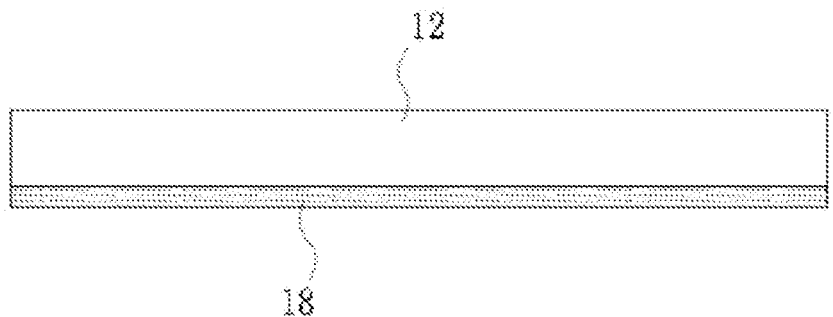
FIG. 4A is a cross-sectional drawing of the formation of the protective layer on the laminating face of the second laminating element in the present disclosure.
Figure 4B:
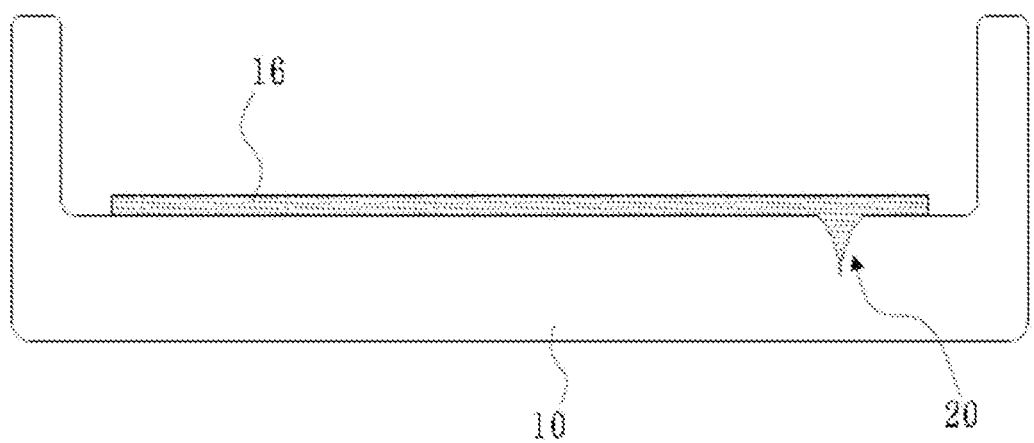
FIG. 4B is a cross-sectional drawing of the formation of the protective layer on the laminating face of the first laminating element in the present disclosure.
Figure 5:
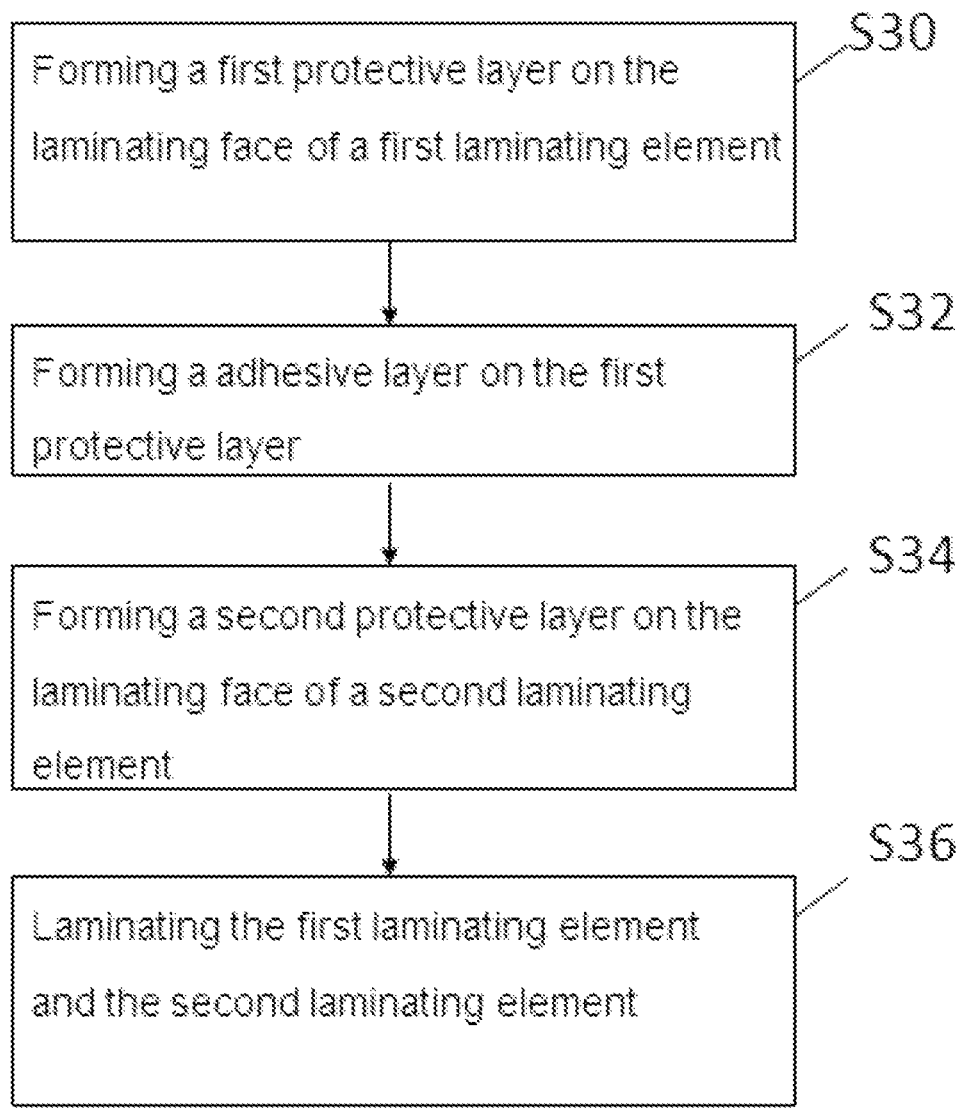
FIG. 5 is a flow chart of a manufacturing process of optical panels in the present disclosure.

FIGS. 4A and 4B show lamination processes of an optical panel and FIG. 5 shows a flow chart of the manufacturing process of the optical panel. According to FIGS. 4A and 4b, a first protective layer 16 is first formed on a laminating face of a first laminating element 10 for flattening the laminating face by ways of printing, spraying or sputtering so that crack 20 in the laminating face can be filled (Step S30). Next, an adhesive layer 14 is formed on the first protective layer 16 (Step S32).

Next, a second protective layer 18 is formed on laminating face of a second laminating element 12 for planarization of this laminating face by using ways such as printing, spraying or sputtering (Step S34). Next, the first laminating element 10 and the second laminating element 12 (Step S36) are laminated to each other by an adhesive layer 14, wherein the adhesive layer 14 is placed between the first protective layer 16 and the second protective layer 18. Steps described previously are finished to constitute the lamination structure of the optical panel in FIG. 1.

The first laminating element 10 can be a cover glass, a plastic shell or a display panel, and the second laminating element 12 can be a touch inductive substrate, wherein the cover glass is laminated with the touch inductive substrate to form a touch panel.

The adhesive layer 14 is an optically adhesive layer and the first protective layer 16 and the second protective layer 18 are gap fillers, wherein the first protective layer 16 and the second protective layer 18 can also be ink layers or SiO2 layers.

In accordance with the lamination structure of the optical panel constituted by the foregoing manufacturing process, for illustration, a crack 20 exists in the laminating face of the first laminating element 10, on which the first protective layer 16 is formed for planarization and then the crack 20 is filled to smooth the surface that is opposite to adhesive layer 14 of the first laminating element 10. Since the crack 20 is filled with the first protective layer 16 to drive the air out, the adhesive layer 14 will not generate bubbles and is further stripped off from the first laminating element 10 due to the air heating expansion, by using mechanisms such as ultraviolet heating solidification.

In the foregoing manufacturing process, it can be taken into account that on the laminating face of the second laminating element 12 or on the laminating face of the first laminating element 10, a protective layer is formed individually, for illustration, when the crack 20 is to be filled by planarization of the laminating face of the first laminating element 10, wherein the first protective layer 16 is not formed on the laminating face of the second laminating element 12, but it is formed on the laminating face of the first laminating element 10, and the adhesive layer 14 is used for the lamination of the second laminating element 12 and the first laminating element 10, as shown, in FIG. 2.

In another condition, the second protective layer 18 is not formed on the laminating face of the first laminating element 10 but is formed on the laminating face of the second laminating element 12 for planarization, wherein the adhesive layer 14 is used for lamination of the second laminating element 12 and the first laminating element 10, as shown in FIG. 3.

The present disclosure therefore provides a stack-up structure of an optical panel and further provides a manufacturing method thereof, in which a protective layer is coated on the surface of a laminating element to overcome the unevenness problem on surface of the laminating element, thereby avoiding the generation of bubbles and enhancing the yield of products.

While certain embodiments have been shown and described, various modifications and substitutions may be made thereto without departing front the spirit and scope of the disclosure. Therefore, it is to be understood that the present disclosure has been described by way of illustration and not limitations.

What is claimed is:

1. A stack-up structure of an optical panel, comprising:
   a first laminating element having a first laminating face;
   a first protective ink layer formed on the first laminating face of the first laminating element for flattening the first laminating face;
   a second laminating element having a second laminating face;
   a second protective ink layer formed on the second laminating face of the second laminating element for flattening the first laminating face; and
   an adhesive layer positioned between the first protective ink layer and the second protective ink layer for laminating the first laminating element and the second laminating element,
   wherein the first protective ink layer covers entire lamination region between the first laminating face and the adhesive layer,
   the second protective ink layer covers entire lamination region between the second laminating face and the adhesive layer, and
   the adhesive layer covers entire lamination region between the first protective ink layer and the second protective ink layer.

2. The stack-up structure of the optical panel of claim 1, wherein the first protective layer and the second protective layer fill cracks on surface of the first laminating element and the second laminating element respectively.

3. The stack-up structure of the optical panel of claim 1, wherein the first laminating element is a cover glass, a plastic shell, or a display panel, and wherein the second laminating element is a touch inductive substrate.

4. The stack-up structure of the optical panel of claim 1, wherein the adhesive layer is an optically adhesive layer.

5. The stack-up structure of the optical panel of claim 1, wherein the first laminating element is a cover glass, and wherein the second laminating element is a touch inductive substrate, further wherein the cover glass is laminated with the touch inductive substrate to form a touch panel.

6. A manufacturing method of a stack-up structure of an optical panel, comprising:
- forming a first protective ink layer on a first laminating face of a first laminating element for flattening the first laminating face;
- completely covering the first protective ink layer with an adhesive layer;
- forming a second protective ink layer on a second laminating face of a second laminating element for flattening the second laminating face; and
- laminating the first laminating face of the first laminating element with the second laminating face of the second laminating element by the adhesive layer;
- wherein the first protective ink layer covers entire lamination region between the first laminating face and the adhesive layer,
- the second protective ink layer covers entire lamination region between the second laminating face and the adhesive layer, and
- the adhesive layer covers entire lamination region between the first protective ink layer and the second protective ink layer.

7. The manufacturing method of the stack-up structure of the optical panel of claim 6, wherein the first protective layer and the second protective layer are formed using one or more of printing, spraying, and sputtering.

8. The manufacturing method of the stack-up structure of the optical panel of claim 6, wherein the first protective layer and the second protective layer fill cracks on surface of the first laminating element and the second laminating element.

9. The manufacturing method of the stack-up structure of the optical panel of claim 6, wherein the first laminating element is a cover glass, a plastic shell or a display panel, and wherein the second laminating element is a touch inductive substrate.

10. The manufacturing method of the stack-up structure of the optical panel of claim 6, wherein the adhesive layer is an optically adhesive layer.

11. The manufacturing method of the stack-up structure of the optical panel of claim 6, wherein the first laminating element is a cover glass, and wherein the second laminating element is a touch inductive substrate, further wherein the cover glass is laminated with the touch inductive substrate to form a touch panel.

12. The manufacturing method of the stack-up structure of the optical panel of claim 6, further comprising:
- solidifying the adhesive layer.

13. The manufacturing method of the stack-up structure of the optical panel of claim 6, further comprising:
- irradiating the adhesive layer with an ultraviolet light.

14. The manufacturing method of the stack-up structure of the optical panel of claim 6, further comprising:
- heating the adhesive layer.

* * * * *